Jan. 17, 1950     R. R. LOBOSCO     2,494,663
SELF-SYNCHRONOUS CUTTING MACHINE
Filed Oct. 27, 1944     2 Sheets-Sheet 2

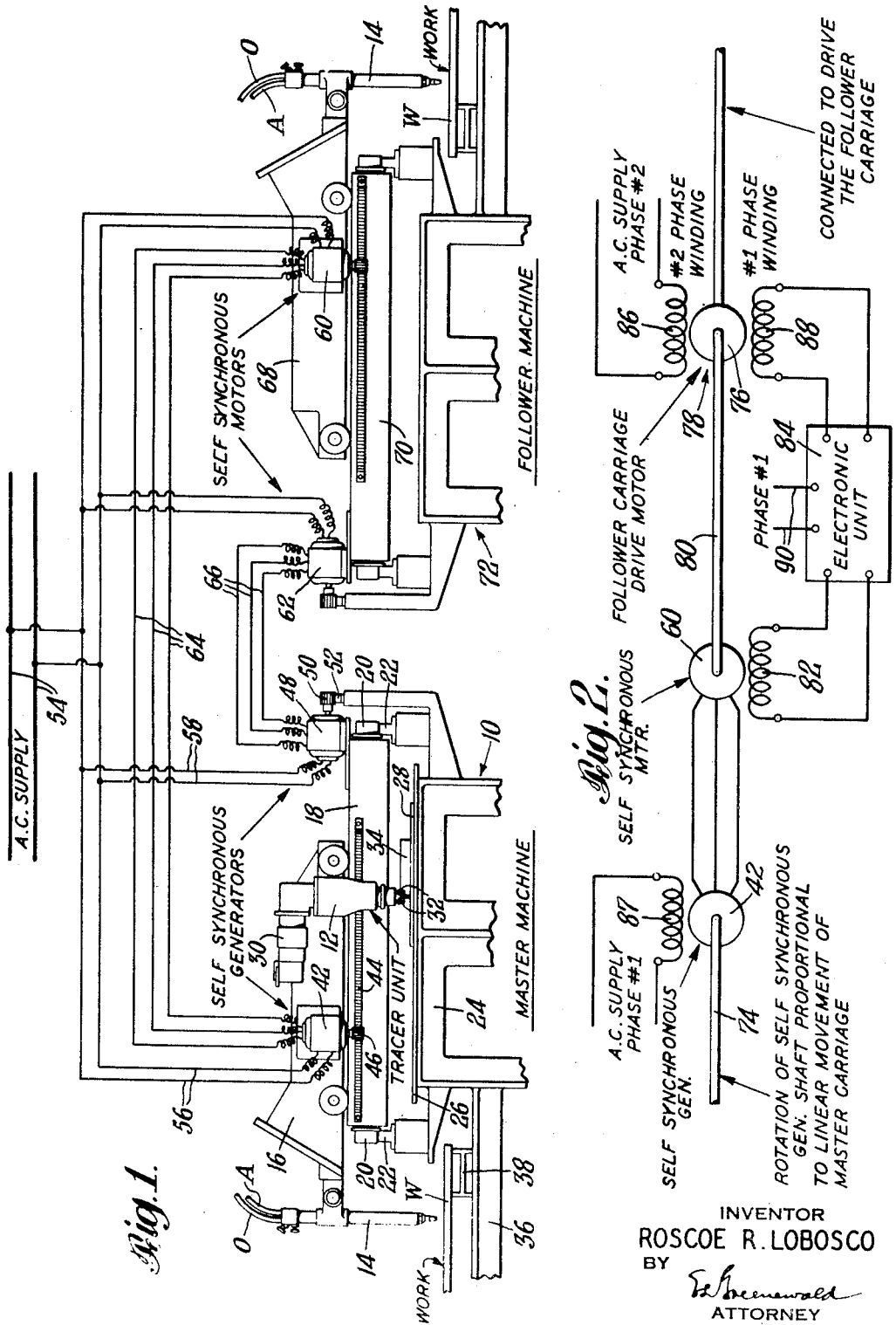

INVENTOR
ROSCOE R. LOBOSCO
BY
ATTORNEY

Patented Jan. 17, 1950

2,494,663

UNITED STATES PATENT OFFICE 2,494,663

SELF-SYNCHRONOUS CUTTING MACHINE

Roscoe R. Lobosco, Elizabeth, N. J., assignor to The Linde Air Products Company, a corporation of Ohio Application October 27, 1944, Serial No. 560,690

3 Claims. (Cl. 266—23)

This invention relates to contouring systems in which a master tracing unit controls one or more follower carriage units, and more particularly to oxy-acetylene shape cutting pattern follower units.

The main objects of the invention are to provide an improved contouring pattern follower system of the self-synchronous type in which a motor driven follower carriage unit smoothly follows the contour traced by the master carriage unit; a straight self-synchronous system in which self-synchronous master generators on a master carriage unit supplies all of the torque required by one or more follower carriage units; and an improved torque amplifier self-synchronous system in which self-synchronous generators on the master tracer carriage unit supplies only a very small torque to rotate self-synchronous motors which, in turn, supply control signals for a torque amplifier system which drives self-synchronous motors on the follower carriage unit or units.

In the straight self-synchronous system, according to the invention, the master tracer is driven by any suitable means, such as that employed in oxy-fuel gas blowpipe cutting machines involving hand tracing, strip template tracing, magnetic tracing, and photocell tracing, for example. The drive system of the master tracer supplies the power necessary to drive itself and at least one self-synchronous motor driven follower carriage unit. The master tracer can also be used as a cutting machine in addition to acting as the tracer. In a two-carriage tracer, according to the invention, two pairs of self-synchronous generators or motors are employed, one pair for each carriage unit. A master or self-synchronous generator is mechanically connected to the master carriage so that the linear motion of the master carriage is converted into a corresponding rotation of the master or self-synchronous generator. A follower or self-synchronous motor is electrically coupled directly to the master. The follower is mechanically connected to the corresponding follower carriage so that the rotation of the follower self-synchronous motor is converted into a corresponding linear motion of the follower carriage.

In the torque amplifier self-synchronous system, according to the invention, the self-synchronous master generator is driven by any suitable means. The driving means of the master tracer, however, is required to supply only enough power to drive the master tracer plus a very slight additional power to drive the master self-synchronous generators regardless of the size or number of the self-synchronous follower motors. The master carriage unit can be used as an oxy-fuel gas blowpipe cutting machine in addition to acting as the master tracer.

In the drawings:

Fig. 1 is a fragmentary view mainly in side elevation of a two-carriage oxy-acetylene contour cutting system exemplifying the invention;

Fig. 2 is a circuit diagram of a modification of the invention; and

Fig. 3 is a more detailed circuit diagram of such modification.

Figure 5:
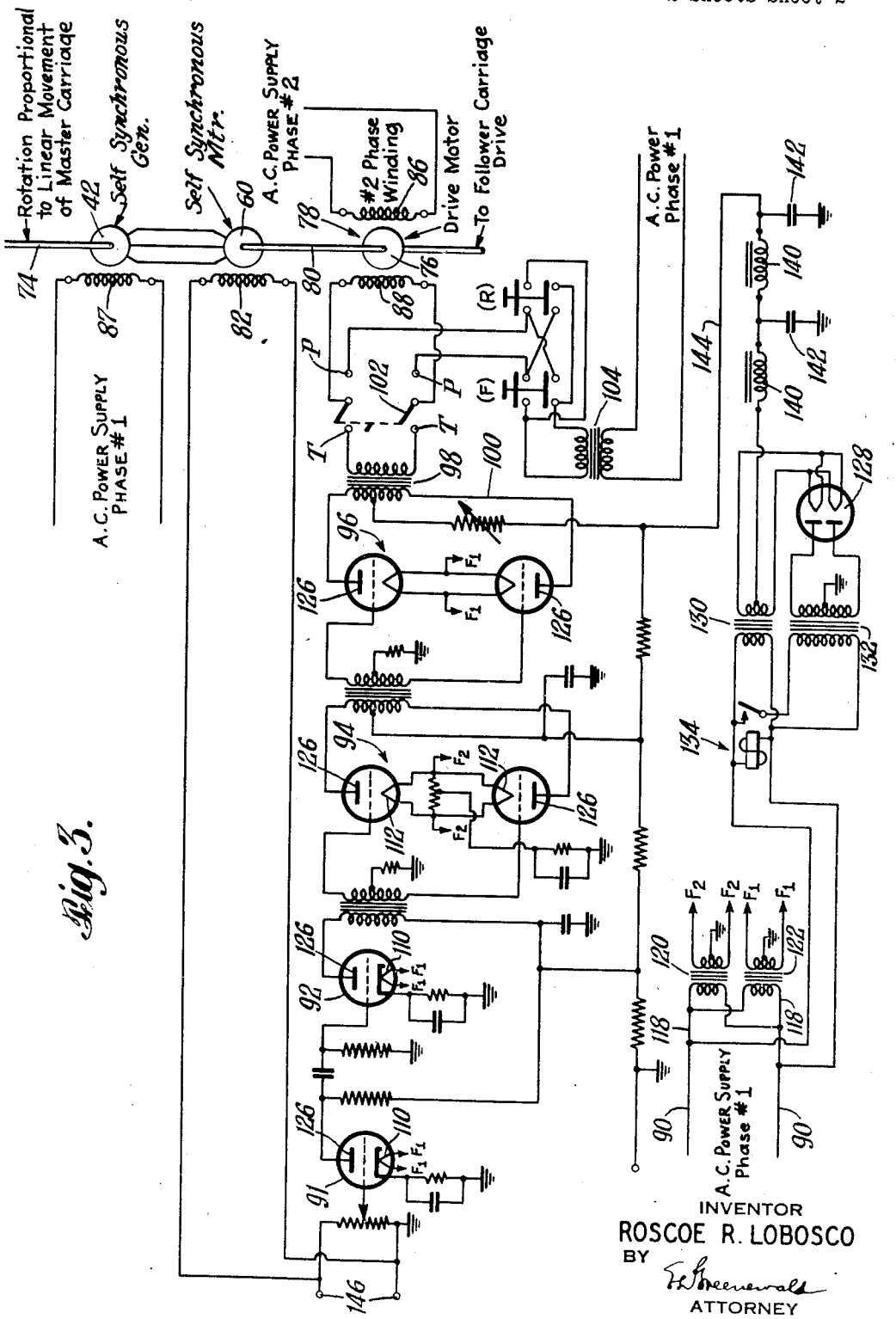

Referring to Fig. 1 of the drawings, a master carriage unit support 10 is provided which includes a tracer unit 12 and an oxy-acetylene cutting blowpipe 14. The tracer unit 12 and blowpipe 14 are mounted on a cross carriage 16 which is, in turn, mounted on a main carriage 18, the carriages 16 and 18 being movable at right angles to each other in a horizontal plane. The main carriage 18 includes supporting wheels 20 which run on horizontal tracks 22, such tracks being mounted on opposite sides of a frame 24 on the top of which is also mounted a table 26 for supporting a template or pattern 28. For turning sharp corners as mentioned hereinafter some other known type of tracer and pattern may be desirable.

The tracer unit 12 is driven by a motor 30, through knurled rolls 32 which engage opposite edges of an upstanding flange 34 of the template 28. Movement of the tracer unit along the path provided by the flange 34 is duplicated by the cutting blowpipe 14 with respect to a horizontally disposed workpiece W consisting of a ferrous metal plate, for example, which is supported in a horizontal position under the blowpipe 14 by a lateral table 36 of the frame 24, the workpiece being supported in spaced relation above the table 36 by I-beams 38. Oxygen and acetylene are supplied to the blowpipe 14 through conventional means including supply hoses O and A. The blowpipe 14 is adapted to discharge a stream of cutting oxygen and an oxy-acetylene flame for severing the workpiece W to produce a contour corresponding to that of the template 28.

The tracer unit 12 drives a master or self-synchronous generator 42 mounted on the cross carriage through means including a rack 44 and gear 46, the rack being mounted on the main carriage 18, and the gear 46 on the armature shaft of the master self-synchronous generator 42. The tracer unit 12 also drives a master self-synchronous generator 48 mounted on the main carriage through means including a gear 50 which meshes with a rack 52, the rack 52 being mounted on the frame 24, and the gear 50 on the armature shaft of the master self-synchronous generators 48. The master self-synchronous generators 42 and 48 are energized from an alternating current source of supply including power lines 54 through conductors 56 and 58 respectively. The master generators are preferably of the conventional self-synchronous type.

The self-synchronous master generators 42 and 48 are electrically coupled directly to corresponding follower self-synchronous motors 60 and 62, respectively, by conductors 64 and 66. The follower motors are preferably of the conventional self-synchronous type which automatically follow movement of the self-synchronous master generators 42 and 48. The follower self-synchronous motors 60 and 62 drive follower carriages 68 and 70 on a follower support 72, the follower carriages 68 and 70 corresponding to the carriages 16 and 18, respectively, of the master apparatus 10. The cross carriage 68 is provided with an oxy-acetylene cutting blowpipe 14 which is movable above a workpiece W, similar to that adjacent the tracer support 10, other parts of the follower apparatus 72 being also similar to corresponding parts of the master apparatus with the exception that the carriages of the follower carriage unit are driven through the self-synchronous motors 60 and 62.

In the operation of the system shown in Fig. 1, any rotation of a self-synchronous master generator causes a corresponding rotation of the self-synchronous follower motor. In order to develop torque there must be some displacement between the respective master generator and follower. The follower will usually lock with the master by an angle proportional to the load. Since a load of the follower carriage is reflected back through the self-synchronous system into the master carriage, the master tracer drive means must supply the driving power required by both the master and follower carriages. Thus, as the tracer unit 12 is driven by the motor 30 over the template 28, the blowpipes 14 smoothly follow corresponding paths, cutting the workpieces W in outlines or contours corresponding to that of the template flange 34.

For any given size self-synchronous generator and motor, the torque developed per degree displacement between the master and follower is dependent on the exciting voltage applied to them and the exciting voltage is limited by the maximum permissible temperature rise in them. Therefore, according to the invention, any well known auxiliary cooling means, such as forced draft cooling, is provided to increase such torque. Another way of developing greater torque when needed, according to the invention, is to maintain the self-synchronous voltage excitation well within its rating during standby or low torque periods and to increase the voltage excitation when the system must deliver a higher torque. This increase in voltage excitation can be accomplished automatically by means responsive to the torque delivered. Such means may be relays or electronic means connected in the rotor or stator self-synchronous circuits, responsive to the voltage and current changes which take place when the delivered torque changes, or torque responsive switch means built into the drive system. It is generally desirable also to connect the self-synchronous generator and motor in such manner as to get as large as possible a ratio of revolutions per minute to inch of travel of the machine carriage. The greater this ratio, the less torque the follower will have to deliver in order to drive the follower carriage and the less will be the displacement between master self-synchronous generator and follower self-synchronous motor.

The master carriage unit and the follower carriage unit may be connected in a one to one ratio so that both trace the same size contour or such master and follower carriage may be connected through a suitable speed changing device provided in either one or both of the self-synchronous systems, so that the follower carriages are caused to trace a contour in some other predetermined ratio with respect to the contour traced by the master carriages.

The intricacy of the contour which can be followed is limited only by limitations of the tracer. The follower can be made to trace a contour which is exactly the same size as the contour traced by the master carriage unit and tracer or it can be made to follow a contour which is larger or smaller than the contour traced by the master carriage unit and tracer by any predetermined ratio. Thus for small intricate work the master carriage unit may be caused to follow an outline which is several times as large as the desired work, while for very large workpieces the master carriage unit and tracer may be caused to follow an outline which is smaller than the desired work.

Referring to Fig. 2, rotor 74 of the self-synchronous master generator 42, for example, is mechanically connected to its master carriage in such manner that linear motion of this master carriage is converted into a corresponding rotary motion of the self-synchronous master generator 42. The follower carriage is driven by armature 76 of a follower carriage drive motor 78 which also rotates rotor 80 of the self-synchronous follower motor 60, for example. The follower carriage drive motor 78 is capable of developing sufficient torque to accelerate and decelerate the follower carriage rapidly enough for it to follow any contour which it may be called on to follow.

When both of the rotors of the self-synchronous generator and self-synchronous motor are in the same relative positions with respect to their stators, no voltage is developed across output winding 82 of the self-synchronous follower motor 60. If the shaft 74 of the self-synchronous master generator 42 is displaced, however, a voltage proportional to the angular displacement between the rotors 74 and 80 will appear across the output winding 82 of the self-synchronous follower motor 60. If the shaft 74 of the master 42 is displaced in the opposite direction, a voltage proportional to the angular displacement between the rotor shafts 74 and 80 will again be developed across the output winding 82 of the self-synchronous follower motor 60 but, in this case, it will be opposite in phase to that developed in the first case.

The voltage developed across the output winding 82 of the self-synchronous follower motor 60 is fed to the input circuit of an electronic unit 84. The electronic unit develops enough power to supply the requirements of the follower carriage drive motor 78.

The drive motor 78 in the illustrated modification is a two phase motor which is mechanically connected to the follower carriage so that its rotary motion is converted into a corresponding linear motion of the follower carriage. One phase winding 86 is supplied directly from an alternating current power source, the other phase winding 88 being connected to the output circuit of the electronic unit 84. If a two-phase alternating current power supply is available, the winding 86 is connected to one phase, and input winding 87 of the self-synchronous master generator and power circuit 90 of the electronic unit are connected to the other phase. If only single-phase power is available, then both the motor winding and the generator must of necessity be connected to the same phase as is well known in the art. In such event, it will be necessary to connect suitable known phase shifting means to one of the motor windings in order to get the phase shift necessary for the motor to develop torque.

When both the self-synchronous generator and self-synchronous follower motor 42 and 60 are in alignment there is no input voltage to the electronic unit 84 and therefore no power is fed to winding 88 of the drive motor 78 and, as a result, no torque is developed by such motor. When the rotor 74 of the self-synchronous generator 42 is displaced, a voltage proportional to the displacement is developed in the output winding 82 of the self-synchronous follower motor 60 and such voltage is amplified by the electronic unit 84 and fed to the winding 88 of the drive motor 78. With both windings energized the motor 78 develops the torque required to keep the follower rotor 80 in alignment with the master rotor 74. Since the drive motor 78 is also connected to the drive mechanism of the follower carriage the follower carriage thus will be moved a distance proportional to the movement of the master tracing carriage.

Fig. 3 shows an electronic unit in the form of a vacuum tube power amplifier feeding the two-phase induction motor 78. However, it should be understood that any other torque amplifying systems fall within the scope of the invention. For the sake of simplicity, prior art peak power limiting devices and antihunt circuits are not shown in Fig. 3. The electronic unit shown in Fig. 3 uses vacuum tubes throughout. The first two tubes 91 and 92 are voltage amplifiers followed by a push-pull driver stage 94 which is, in turn, followed by a power amplifier stage 96. An output transformer 98 couples the output circuit 100 of the power amplifier stage 96 to the phase winding 88 of the two-phase motor 78. Since such unit is a straight-forward amplifier, no further description thereof need be given. The illustrated circuit, however, includes manually operated positioning means to locate the follower carriage in any desired position before locking it in step with the master carriage or for using the follower to handle its workpieces. This circuit does not show interlock circuits, relays, safety features, etc. which are desirable in a circuit of this type.

The manually operated positioning means of the circuit is used in the following manner. By means of a trace-positioning double-pole double-throw switch 102, winding 88 of the motor 78 is connected to contacts P—P. Then by means of forward and reverse pushbutton switches F and R the drive motor 78 is driven in a clockwise or counter-clockwise direction so as to bring the follower carriage to the desired position, the winding 88 being energized through a transformer 104 by the alternating current power phase #1. The speed of the motor can be controlled to some extent by means of the taps on the transformer 104 feeding winding 88 of the motor 78, or by inserting resistance, or by other suitable means, not shown, because well known in the art. Large motors may require usual starting equipment not shown in the circuit. When the carriage is properly positioned, the #2 phase winding 86 of the motor 78 is connected by switch 102 to contacts T—T which causes tse follower carriage to be locked in synchronism with the corresponding carriage of the tracing machine. The other carriage is positioned in a similar manner.

Thus, by using a circuit such as that shown in Fig. 3, the carriage drive motors can also be used to position the follower carriages before locking them in circuit relation with the master machine. This is particularly advantageous where large, heavy carriages are to be positioned with respect to the workpiece, since the operator could be near the blowpipes, and control the carriages by means of a pair of pushbutton switches which could be conveniently located. If the follower carriage construction is heavy enough they can be equipped with handling devices to handle their own workpieces.

As shown in Fig. 3, phase #1 of the alternating current supply energizes the heaters 110 and filaments 112 of the amplifier tubes through conductors 118, transformers 120 and 122 and conductors F1 and F2, respectively. The anodes 126 of such tubes are supplied with suitable plate potentials by a full-wave rectifier 128 including the transformers 130 and 132. The primary winding of transformer 130 is connected directly to conductor 118 but the primary winding of transformer 132 is connected to the conductors 118 by a time delay relay 134. Inductance and capacitance filter elements 140 and 142 are provided in the plate potential circuit 144. The amplifier tubes operate to suitably increase any voltage applied to the input terminals 146, such increased voltage being applied by the output terminals T to the motor winding 88. The normal operation of the system shown in detail in Fig. 3 is like that described above in connection with Fig. 2.

The torque required to rotate the master 42 may be quite small, of the order of a small fraction of an ounce-inch, for example, while the torque delivered by the drive motor may be many pounds feet. The system can be made accurate to a small fraction of one degree. Thus, it can be seen that the system is a torque amplifier of very high accuracy. It is this combination of great accuracy and great torque amplification which makes it possible to remove many of the limitations of ordinary drive systems.

Since the follower carriage unit drive can be made much more powerful than the conventional tracing machine drive, the usual weight limitations are removed and the follower can be made much sturdier in construction than is usual in a cutting machine. The drive motors of the follower carriage unit can, if desired, be motor driven independent of the master carriage unit so that the follower carriage unit can be positioned wherever desired independent of the movement of the master carriage unit.

Figs. 2 and 3 show the motor rotor shaft directly connected to the follower rotor shaft. Therefore, the angular displacement of follower rotor will be the same as that of the drive motor rotor. By inserting gearing or other suitable speed changing means between the follower and the drive motor, it is possible to have the follower rotor turn at some fraction or some multiple of the drive motor rotor speed. By inserting the proper speed change gears or some other suitable speed changing means between the drive motor and the drive mechanism of the follower carriage, any desired ratio between movement of the master tracer carriage and the movement of the corresponding follower carriage can be secured. It is evident that by taking advantage of the above features, the movement of the follower carriage can be made to bear any desired ratio with respect to the movement of the master tracer carriage. It is further evident that this ratio can also be changed at will by changing by some suitable means the ratio of master R. P. M. (revolutions per minute) to I. P. M. (inches per minute) of linear travel of the master carriage.

This feature makes it possible to have the follower carriage unit trace a contour which is larger or smaller, as desired, than the contour followed by the master tracer. By changing the ratio of only one of the two cross carriages, it is possible to secure another unusual feature. For example, the follower carriage unit can be made to trace an ellipse having any desired major and minor axis when the master carriage unit is tracing a circle or the follower carriage unit can be made to trace an oblong when the master carriage unit is tracing a square. These features permit the cutting of a large variety of sizes and shapes from a few well selected master templets.

In order to secure the best results, it is essential that backlash in the drive and followup system be kept to a minimum. Inertia in both the machine and the drive system should be made as small as possible. The drive motor inertia can be made small by designing the rotor to have a small inertia and by supplying auxiliary cooling to the motor. Auxiliary cooling of the motor 78 is important because by means of it a small, low inertia motor can be made to deliver as much torque as a much larger motor which is dependent on the conventional means of cooling and having a much greater inertia because of its larger size.

The drawings show the self-synchronous follower geared or directly connected to the follower carriage drive motor. However, in certain installations it might prove to be more desirable to tie in the follower to some other part of the system, for example, to an idler wheel. This is important where a friction drive is used to drive the carriage and, therefore, there is likely to be slippage in the drive system. Since the idler wheel would have to supply only the very small torque required by the self-synchronous motor it would not tend to slip and therefore would supply a sure indication of the movement of the follower even though the drive system did slip.

Any one of a number of circuits may be used in the control unit. These circuits may incorporate a peak power limiting circuit, or any one of a number of known power amplifying systems.

Other known types of master and follower systems than the self-synchronous type may be used provided they possess suitable accuracy. Power can be delivered to the follower carriages by means of an A. C. or D. C. motor, a hydraulic motor or a pneumatic motor. The self-synchronous control can consist of the two self-synchronous unit systems shown or a three self-synchronous unit differential system. Remote control such as positioning the blowpipe, rotating the nozzle or blowpipe, adjustment of the bevel angle can also be accomplished by means of straight or torque amplifier self-synchronous systems or a motor drive.

The lower carriage can be made to carry two or more upper carriages. A two upper carriage system with two carriages operating 180 deg. out of phase can be used to produce two simultaneous cuts in a workpiece which is symmetrical about an axis, thus reducing the cutting time in half. It is evident that other variations also are possible. For example, two lower carriages each mounting two upper carriages may be used to make four simultaneous cuts in certain workpieces.

In Fig. 1 using the straight self-synchronous connection, the master generator itself supplies the torque to drive the follower carriage. By taking care to keep the required torque low enough, the two carriages remain substantially in synchronism and there is no need to resort to any expedient such as stopping the tracer carriage in order to permit the follower carriage to catch up.

In Figs. 2 and 3, using the torque amplifier arrangement, the follower does not actually supply the power to move the follower carriage but instead controls a torque amplifier which in turn supplies the actual drive power to move the follower carriage. By means of this arrangement, a drive power proportional to the requirements is supplied to the follower carriage. Therefore, any tendency for the follower carriage to lag behind the tracer carriage is immediately corrected by an increase in drive power just sufficient to keep it in synchronism with the tracer carriage. Similarly, any tendency for the follower carriage unit to get ahead of the tracer is counteracted by a reduction in the drive power delivered to the follower carriage unit, and if necessary, a reverse or braking force proportional to the requirements necessary to keep the tracer and follower carriages in synchronism. This results in smooth operation of the follower carriage especially when accelerating and decelerating. This is obviously an improvement over old systems which do not supply means for proportioning the drive power to the needs and can apply only full drive power or none at all.

What is claimed is:

1. A tracer, a self-synchronous generator mechanically connected thereto, a follower tool, a self-synchronous motor mechanically connected to said tool, means electrically connecting said self-synchronous motor, follower tool and said tracer self-synchronous generator to effect movements of said tool according to the movements of said tracer, switch means whereby said follower tool may be disconnected and reconnected from and to said tracer self-synchronous generator and said tool may be moved independently of said tracer while disconnected therefrom and then reconnected to said tracer in a new position of said tool, and an electric motor means for moving the tool while disconnected from said tracer, said last mentioned motor means being mechanically and electrically connected with said self-synchronous motor.

2. The combination with a pattern holder, of a tracer, means whereby the tracer and pattern holder may be moved relatively to one another universally in a plane parallel to the pattern holder, a follower tool, a work holder, means for relatively moving the tool and work holder in response to the extent of said relative movement between the tracer and pattern holder, means for disconnecting said tool from said tracer, means for moving the tool while so disconnected, said last mentioned means including a motor in common with said means for relatively moving the tool in response to said tracer.

3. In apparatus for controlling the movement of a cutting blowpipe, a tracer, means for driving the tracer at a uniform speed, a follower carriage to which said blowpipe is secured, and means for moving the follower carriage at a uniform rate in response to movement of said tracer, the combination therewith of the improvement enabling said follower carriage to be widely separated from said tracer while preserving its faithfulness of response to said tracer and also enabling said blowpipe to be free of objectionable vibrations while mounted on and propelled by a heavy follower carriage, said improvement comprising a master carriage for the tracer independent of said follower carriage, a self-synchronous generator on said master carriage, a self-synchronous motor on said follower carriage electrically connected with said self-synchronous generator for control thereby, a tractor motor on the follower carriage having a rotor for driving the same through gearing and mechanically and electrically connected with said self-synchronous motor, and torque amplifying means in the electrical connections between said tractor and self-synchronous motors, whereby any tendency for the tractor motor to over-run or under-run with respect to the master carriage due to inertia of the tractor motor rotor is reduced irrespective of the weight of said follower carriage.

ROSCOE R. LOBOSCO.

REFERENCES CITED

The following references are of record in the file of this patent:

UNITED STATES PATENTS

| Number | Name | Date |
|---|---|---|
| Re. 16,667 | Hewlett et al. | July 5, 1927 |
| 1,126,826 | Missbach | Feb. 2, 1915 |
| 1,347,695 | Gillespie | July 27, 1920 |
| 1,554,980 | Ellis | Sept. 22, 1925 |
| 1,562,917 | Richter | Nov. 24, 1925 |
| 1,589,933 | Bontempi | June 22, 1926 |
| 1,747,664 | Droitcour | Feb. 18, 1930 |
| 1,800,760 | Sleeper | Apr. 14, 1931 |
| 1,826,963 | Stansbury | Oct. 13, 1931 |
| 1,954,142 | Moffett | Apr. 10, 1934 |
| 1,956,581 | Krebs | May 1, 1934 |
| 1,998,939 | Mittag | Apr. 23, 1935 |
| 2,057,820 | Corwin | Oct. 20, 1936 |
| 2,269,643 | Bechtle et al. | Jan. 13, 1942 |
| 2,279,338 | Oldham | Apr. 14, 1942 |
| 2,323,977 | Chelborg et al. | July 13, 1943 |
| 2,395,351 | Sohn | Feb. 19, 1946 |
| 2,413,300 | Dunn et al. | Dec. 31, 1946 |

FOREIGN PATENTS

| Number | Country | Date |
|---|---|---|
| 489,271 | Great Britain | July 22, 1938 |
| 529,677 | Germany | July 16, 1931 |
| 626,443 | France | Sept. 6, 1927 |

OTHER REFERENCES

"Selsyns"—Gen'l Electric Publication #GEA-722B, September 1930.